United States Patent [19]
Mani et al.

[11] Patent Number: 5,281,317
[45] Date of Patent: Jan. 25, 1994

[54] ELECTRODIALYTIC WATER SPLITTING PROCESS FOR REMOVING $SO_2$ FROM GASES

[75] Inventors: Krishnamurthy N. Mani, Basking Ridge; Yu C. Chiao, Bridgewater; James M. DiPalma, Chatham, all of N.J.

[73] Assignee: AlliedSignal Inc., Morris Township, Morris County, N.J.

[21] Appl. No.: 775,875

[22] Filed: Oct. 15, 1992

[51] Int. Cl.[5] .............................................. B01D 61/44
[52] U.S. Cl. ................................. 204/182.4; 204/98; 423/243.01
[58] Field of Search ............... 204/182.4, 98; 423/242, 423/244

[56] References Cited

U.S. PATENT DOCUMENTS

| | | |
|---|---|---|
| 4,082,835 | 4/1978 | Chlanda et al. ........................ 423/242 |
| 4,107,015 | 8/1978 | Chlanda et al. ........................ 204/182.4 |
| 4,552,635 | 11/1985 | Jenczewski et al. .................. 204/182.4 |
| 4,592,817 | 6/1986 | Chlanda et al. ........................ 204/182.4 |
| 4,615,780 | 10/1986 | Walker ................................... 204/182.4 |
| 4,629,545 | 12/1986 | Mani et al. ............................. 204/182.4 |
| 4,738,764 | 4/1988 | Chlanda et al. ........................ 204/296 |
| 4,820,391 | 4/1989 | Walker ................................... 204/182.4 |

FOREIGN PATENT DOCUMENTS

246403 11/1987 European Pat. Off. .

OTHER PUBLICATIONS

Mizutani, "Ion Exchange Membranes With Preferential Permselectivity for Monovalent Ions", *Journal of Membrane Science*, Jul., 1990 pp. 232-257.

"Structure of Ion Exchange Materials" *Journal of Membrane Science*, Yukio Mizutani (Aug. 21, 1989) pp. 120-145.

*Primary Examiner*—John Niebling
*Assistant Examiner*—Arun S. Phasge
*Attorney, Agent, or Firm*—Karen A. Harding; Jay P. Friedenson

[57] ABSTRACT

The present invention comprises an improved electrodialytic cell and closed loop process for removing $SO_2$ from $SO_2$ containing gases. An aqueous scrubbing medium is used to remove the $SO_2$ from the gas. A two compartment electrodialytic water splitter and a means for stripping is used to isolate the $SO_2$ and regenerate the aqueous scrubbing medium. Use of univalent cation selective membranes, recycling of the acid product to the base loop of the water splitter, and a prescrubber allow high concentrations of scrubbing solution to be treated without significant fouling inside the membranes. The above process embodiments may be used either alone or in combination.

12 Claims, 5 Drawing Sheets

ELECTRODIALYTIC WATER SPLITTING PROCESS FOR REMOVING SO₂ FROM GASES

SUMMARY OF THE INVENTION

The present invention comprises an improved electrodialytic cell and process for removing $SO_2$ from other gases, and recycling the scrubbing medium.

BACKGROUND OF THE INVENTION

The release of certain chemical species such as $SO_2$, $CO_2$, $NO_x$ and volatile organic chemicals into the air and atmosphere has become regulated. Coal burning power plants in particular have been searching for ways to decrease the levels of $SO_2$ which escapes from the plant and into the atmosphere. In attempts to comply with environmental regulations various scrubbing systems have been developed. In each system the $SO_2$ gas is passed over or through the scrubbing medium to generate an acidified sulfur rich medium. Scrubbing may be accomplished via lime and limestone scrubbing, magnesium oxide scrubbing or sodium scrubbing with thermal, electrolytic or electrodialytic regeneration. The present invention is directed toward an improved process which utilizes aqueous scrubbing followed by electrodialytic regeneration.

U.S. Pat. Nos. 4,082,835 and 4,107,015 disclose absorbing $SO_2$ into a basic compound to achieve a substantially soluble, acidic compound followed by regeneration of the basic compound and liberation of the $SO_2$ via treatment in a two compartment electrodialytic water splitter. The product from the acid compartment of the water splitter may be stripped to remove the $SO_2$ and the remaining acid product may be treated in a three compartment water splitter to recover acid and base which may be recycled to the scrubbing stage.

U.S. Pat. No. 4,552,635 discloses a method for removing and recovering sulfur oxides from gases and regenerating the process liquors by contacting the gases with an aqueous hydroxide in a first reaction zone to produce an aqueous salt solution, contacting the aqueous salt solution with aqueous sulfuric acid in a second reaction zone to form sulfurous acid and aqueous soluble sulfates, removing the sulfurous acid by liberating gaseous $SO_2$, and regenerating the sulfuric acid and hydroxide solution via electrodialytic treatment. Either a two or three compartment water splitter may be used and the sulfuric acid and aqueous hydroxide which are recovered may be recycled back to the appropriate reaction zones.

U.S. Pat. No. 4,592,817 discloses an improved electrodialytic water splitting process for recovering metal or ammonium values from materials comprising a salt of a first acid while avoiding formation of gas bubbles in the electrodialytic unit. The salt of a first acid is contacted with a solution comprising a second acid to produce a solution containing the first acid and a salt of the second acid. The first acid is recovered and the second acid is regenerated via electrodialytic treatment in either a two or three compartment water splitter.

U.S. Pat. No. 4,629,545 discloses an electrodialytic water splitting process for recovering $SO_2$-containing gases from the alkaline sodium scrubbing of sulfur dioxide from $SO_2$-containing gases and converting the spent scrubbing materials into sodium hydroxide. The disclosed process includes contacting $SO_2$-containing gas with an aqueous solution containing $Na_2CO_3$, $NaHCO_3$ or mixtures thereof, recovering the aqueous reaction mixture, and treating the aqueous reaction mixture in an electrodialytic water splitter to produce a $H_2SO_3$ solution from which gaseous $SO_2$ may be produced, and an aqueous hydroxide ion-enriched solution. Either a two or three compartment water splitter may be used.

However, the processes described above all suffer from practical drawbacks which result in a decrease in process efficiency. Flyash particulates in the flue gas are solubilized in the $SO_2$ absorption step. Once the solubilized particulates are fed into the electrodialytic water splitter metals tend to precipitate inside the base loop of the two compartment cell, and on the cation and bipolar membranes. Typical metal contaminants in the absorber liquid include Ca, Mg, Fe, V, Si, Al, Cr and Ni. These elements have sufficiently low solubilities at the higher pH which is typically found in the base loop and at the anion surfaces of the bipolar membranes that the metals precipitate and foul the membranes and other internal features of the cell stack such as gaskets, membrane supports and spacers. Calcium, magnesium and iron are frequently present in quantities between about 10 ppm and 250 ppm. One option is to pretreat the feed solution to remove the multivalent metals by, for example, using chelating resins or ion exchange. However, pretreatment steps are not preferred because they add to the complexity and cost of the process. Attempts to control the pH of the base loop at a level above which the metal contaminants are soluble to mitigate fouling have met with only limited success. Further, metals in the acid loop transport across the cation membranes to the base loop and increase the concentration of contaminants, thereby exacerbating the fouling problem. Attempts to reduce fouling by increasing the circulation rates and adding periodic wash steps help abate the fouling problem, but are not a totally satisfactory solution. Thus, there remains a continuing need for a practical solution to the fouling problems experienced in the electrodialytic processing of $SO_2$-containing gases. A goal of the present invention is to minimize either the amount of metal ions which are fed into the electrodialytic water splitter or their effect on the membranes.

Another problem is the precipitation of sulfite and sulfate in anion layer of the bipolar membrane adjacent to the base loop due to the high ionic strength of the solutions which are processed there. Sulfite/sulfate precipitation damages the bipolar membranes. It is desirable to operate the absorber at the highest feed solution concentration possible. However, high concentrations of $Na^+$ are transported from the acid loop to the base loop generating NAOH and further increasing the ionic strength and sulfite/sulfate precipitation. Thus, another object of the present invention is to decrease the ionic strength of the solution treated in the base loop without decreasing the spent absorbent concentration.

DETAILED DESCRIPTION OF THE INVENTION

The present invention discloses three process features which greatly increase membrane and process life. Each of the three embodiments is described in detail below in coordination with the appended figures.

Figure 1:
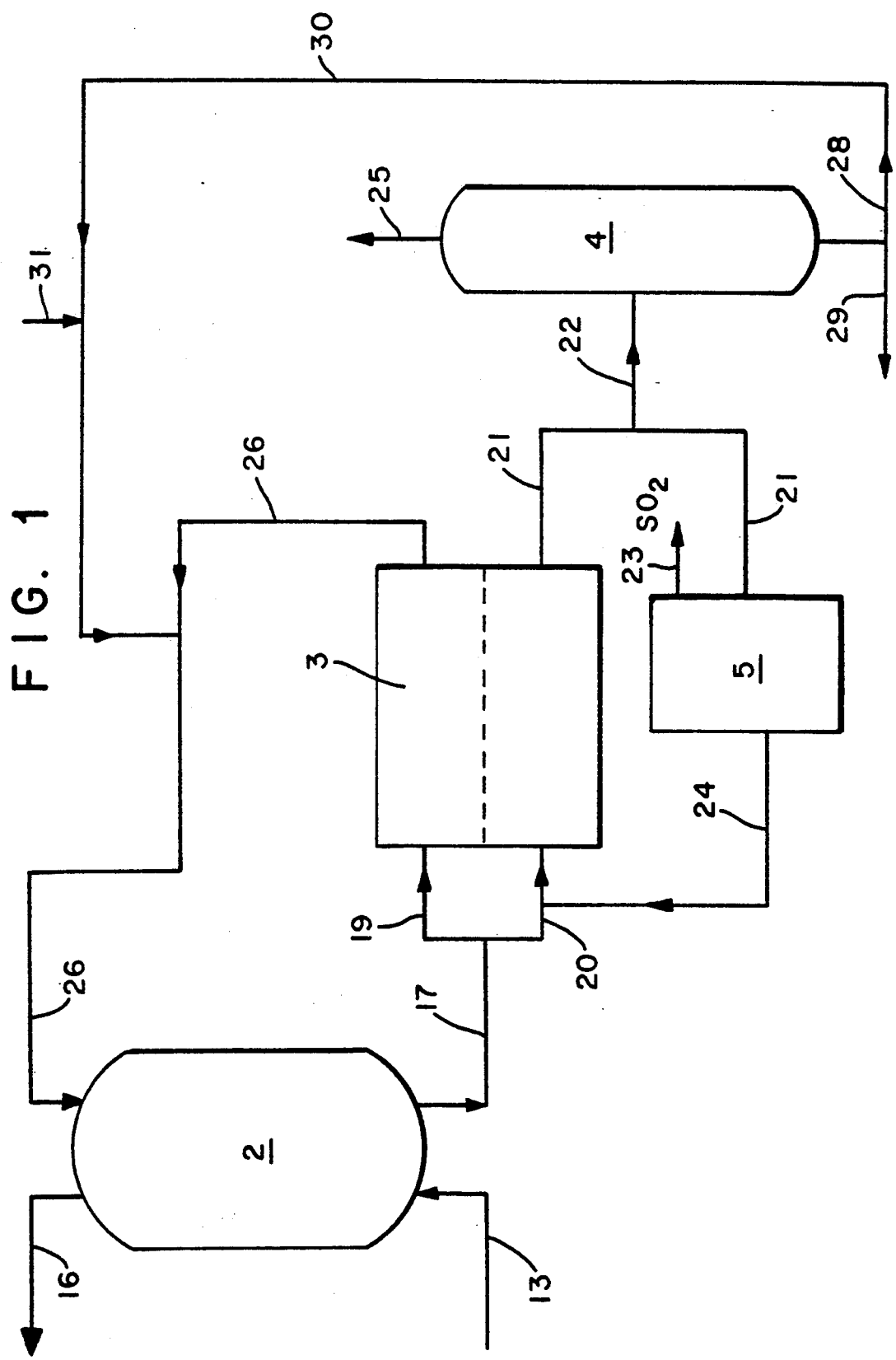
FIG. 1 shows a simplified closed loop process which utilizes the improved cell configuration of the present invention.

FIG. 1 shows the first aspect of the present invention. SO₂ is removed from a gaseous stream via treatment with a base in absorber 2. Significant quantities of metal contaminants, such as Fe, Ca, V, Si, Al, Cr, Ni and Mg are included in the absorber product stream, and would cause fouling in conventional water splitting cells. It has been found, however, that by using univalent selective cation membranes (shown as membranes 106 and 108 in FIG. 2) in the water splitter the transport of metal contaminants is substantially reduced and fouling is minimized. The SO₂-containing gas is fed into absorber 2 via line 13, and an absorbent solution is fed via line 26. The absorbent solution is any solution capable of absorbing SO₂, and should have a pH greater than aqueous SO₂. Preferably the absorbent solution comprises at least one cation which can combine with SO₂. Suitable cations include soluble univalent cations, such as Na$^+$, K$^+$ and NH$_4^+$. Organic acids may also be included in the absorbent solution to keep the pH of the solution at approximately 6 to 7 which reduces oxidation and may enhance solubility in the absorber. Phosphates, citrates, acetates and formates are examples of organic acids which may be used. Dibasic acids such as adipate or adipic acid may also be used.

The reactions which occur in the absorber are as follows:

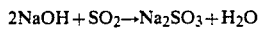

$$2NaOH + SO_2 \rightarrow Na_2SO_3 + H_2O$$

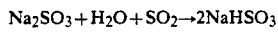

$$Na_2SO_3 + H_2O + SO_2 \rightarrow 2NaHSO_3$$

$$Na_2SO_3 + \tfrac{1}{2}O_2 \rightarrow Na_2SO_4 \text{ (side reaction)}.$$

Clean gas, containing substantially less SO₂ which meets regulatory emission standards is removed from the absorber via line 16, and may be vented to the atmosphere. The absorbing solution, enriched in SO₂ is removed from the absorber via line 17. A portion of the stream is fed to the base compartment of water splitter 3 via line 19, and the remainder of the stream is fed to acid compartment via line 20.

The water splitter 3 (shown in detail in FIG. 2) of this embodiment comprises alternating univalent selective cation membranes 106 and 108 and bipolar membranes 105 and 107. The univalent cation membranes selectively transport cations having a valence of 1 over cations having a valence of 2 or higher to the adjacent base compartment. By using univalent selective membranes the transport of solubilized metals, such as Fe, Ca and Mg to the adjacent base compartment, which are likely to foul the bipolar membranes is greatly reduced, and other anti-fouling measures (such as substantially increasing recirculation rate, or periodically flushing the cell) need be used much less frequently or not at all. This is particularly important in a closed loop process, such as the process of the present invention, as make-up streams and washing steps add to the complexity and cost of the process.

Figure 3:
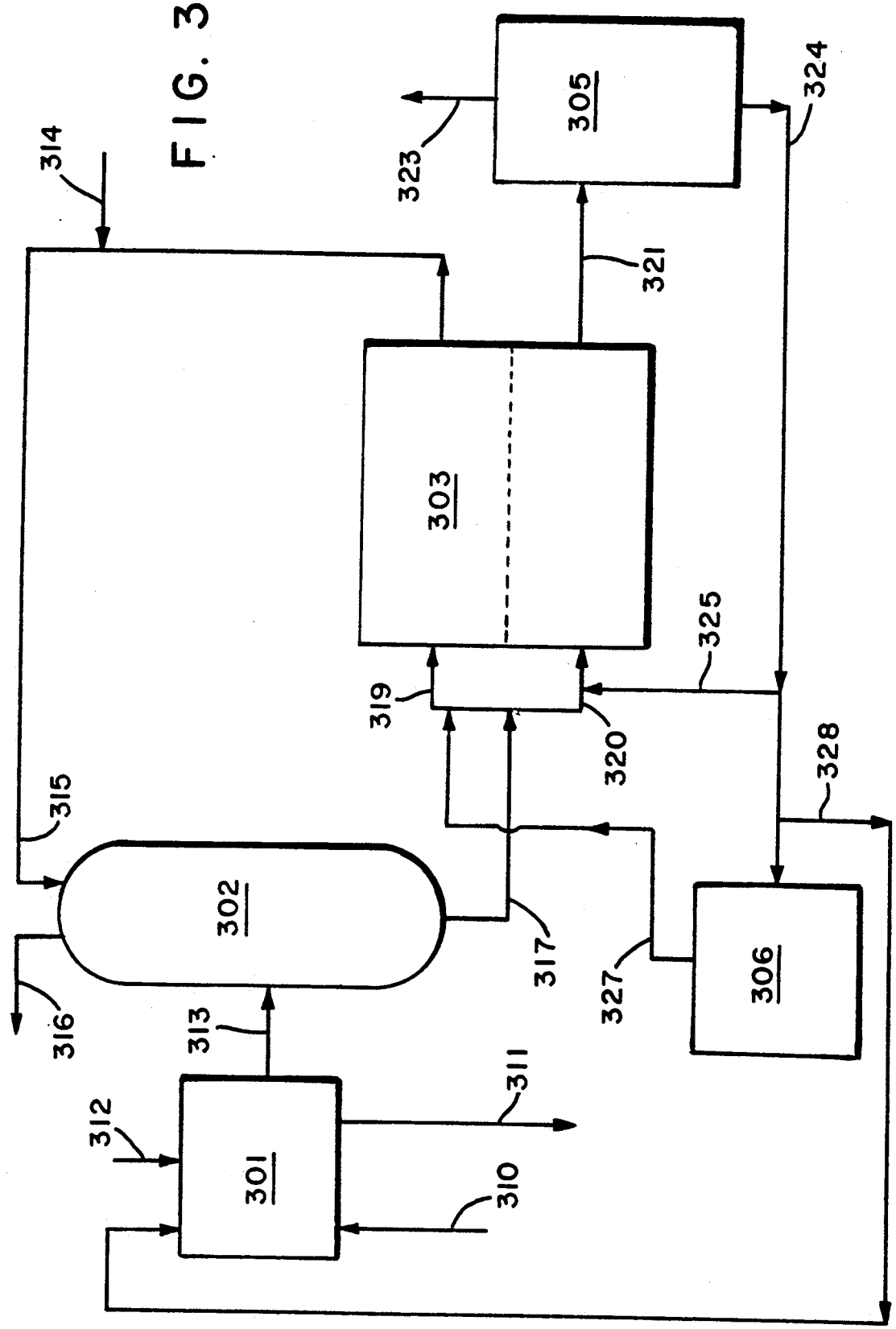
FIG. 3 shows an alternate process embodiment where at least a portion of the $SO_2$-depleted acid product stream is recycled to the base compartment of the water splitter, and/or to the prescrubber, thereby decreasing the ionic strength of the solutions treated in the base loop and/or avoiding the need for a second SO₂ stripping step.

Even though other antifouling measures are not required when univalent selective cation membranes are used, the efficiency of the overall system may be further improved by using antifouling measures in coordination with univalent selective cation membranes. For example, the base loop of the water splitter can be operated at lower pH to retain solids in solution (e.g. pH 6-7). The current across the water splitter may also be periodically interrupted, metals may be purged from the down stream SO₂ stripper product solution, or a pre-scrubber may be added to the system as shown in FIG. 3, which is discussed in detail below.

Figure 2:
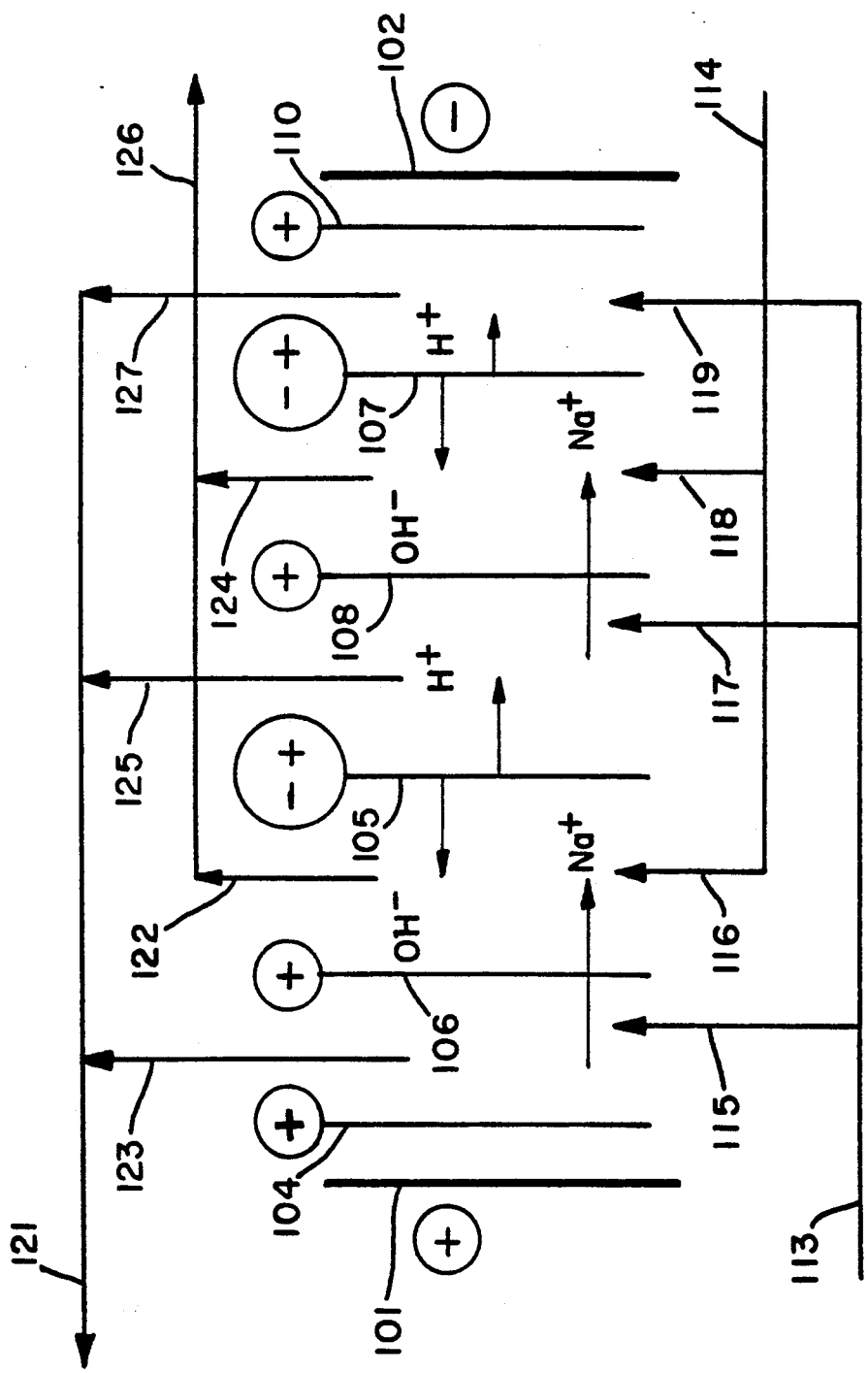
FIG. 2 shows an expanded view of a typical two compartment water splitter.

FIG. 2 shows an expanded view of the two compartment cell useful for reducing fouling. Cation membranes, 104 and 110, separate the anode, 101, and cathode, 102, from the two compartment water splitter. Preferably anode 101 is a DSA-type anode and cathode 102 is a stainless steel cathode, and the solution fed to the anode and cathode compartments is 5-15 weight % Na₂SO₄ for a Na+ system. Alternating univalent selective cation, 106, 108, and bipolar membranes, 105, 107, are serially arranged between the anode, 101, and cathode, 102. Each bipolar membrane has a cation and an anion layer, such that under the influence of a direct current, water at the bipolar membrane is split into H$^+$ and OH$^-$. Examples of such bipolar membranes are disclosed in U.S. Pat. No. 4,116,889, and made by Allied-Signal. While the invention discloses a bipolar membrane to split water it is understood by one skilled in the art that any configuration which is capable of splitting water under the influence of a direct current, such as spaced apart anion and cation membranes may also be used.

There is a base compartment between cation membranes 106 and 108, and the anion layers of bipolar membrane 105 and 107 respectively. Acid compartments are formed between the cation layers of bipolar membranes 105 and 107, and cation membranes 108 and 110 respectively.

Under the influence of a direct current the univalent selective cation membranes will allow cations with a 1+ valence to pass through but will act as a barrier to cations with a higher valence, and to anions. Examples of suitable monovalent selective cation membranes are disclosed in "Ion Exchange Membranes with Preferential Permselectivity for Monovalent Ions", J. Membrane Science, 54 (1990) 233-257. Examples of such membranes are CSR or CSV cation membranes made by Asahi Glass. Univalent selective cation exchange membranes are also commercially available from Tokuyama Soda as CMS or CIMS.

A direct current is passed across the two compartment water splitter of FIG. 2, and the following reactions take place:

| Acid Loop: | $NaHSO_3 + H^+ - Na^+ = H_2SO_3$ |
|---|---|
| | $Na_2SO_3 + 2H^+ - 2Na^+ = H_2SO_3$ |
| | $Na_2SO_4 + H^+ - Na^+ = NaHSO_4$ |
| Base Loop: | $Na^+ + OH^- = NaOH$ |
| | $NaOH + NaHSO_3 = Na_2SO_3 + H_2O$ |

Sodium is shown as an example and as the preferred alkali, however, other univalent cations such as K$^+$ and NH$_4^+$ can also be used. Univalent sodium cations migrate across cation membranes 106 and 108 toward cathode 102. Multivalent cation membranes are preferentially retained in the acid compartment. Water is split into $H^+$ and $OH^-$ at bipolar membranes 105 and 107; the acid compartments are enriched in $H^+$, and the base compartments are enriched in $OH^-$. A solution enriched in NAOH is withdrawn from the base compartments via internal lines 122 and 124, which is withdrawn from the water splitter via outlet line 126 (which corresponds to line 26 in FIG. 1) and may be recycled to absorber 2. A portion of the base product stream may be recycled back to the base compartment of water splitter 3, via a line not shown.

A solution which is depleted in sodium, and containing $H_2SO_3$ and $NaHSO_3$ or $NaHSO_4$ is removed the acid compartments via internal lines 121, 123 and 125, and withdrawn from the water splitter via outlet line 121 (which corresponds to line 21 depicted in FIG. 1). The acid product stream may be held in acid recycle tank 5, for recycling via line 24 to the acid compartment of the water splitter. $SO_2$ is removed from acid recycle tank 5 via vacuum, $N_2$ purge or steam stripping, and is vented from the closed loop via line 23. The recovered $SO_2$ may be liquefied, reduced to sulfur, or converted to $H_2SO_4$, and sold.

As a result of sulfite oxidation in the absorber, a certain amount of $Na_2SO_4$ is present in the various electrodialytic processing streams. Its presence is particularly of value in the acid loop because it acts as a supporting electrolyte. A supporting electrolyte such as the $Na_2SO_4$ present in the acid stream, increases the ratio of $Na^+$ ions to $H^+$ ions thereby facilitating the desired transport of $Na^+$ ion across the cation membrane. Transport of $H^+$ ions leads to inefficiency due to the formation of $H_2O$ in the base loop. This preferential transport of $Na^+$ ions increases the concentration of base formed in the base compartment. However, the univalent selective cation membranes also preferentially transport $H^+$ over other monovalent cations, such as $Na^+$. Consequently a higher $Na_2SO_4$ concentration in the acid loop will be required to achieve current efficiencies comparable to the non-selective cation membrane.

A portion of the water splitter effluent is directed via line 22 for stripping in stripper 4. Dissolved $SO_2$ is removed from the water splitter effluent via the application of $N_2$, vacuum, steam or any combination thereof. The stripped $SO_2$ is withdrawn via line 25. The $SO_2$ depleted solution is withdrawn from stripper 4 via line 28, and may either be purged via line 29, or may be recycled to base absorbent recycle stream 26 via line 30. The amount of Na salt purged in stream 29 is equivalent to the amount of sulfite oxidization and other anion pick up ($Cl^-$, $NO_3^-$) in the absorber. Alkali makeup may be added to line 30 via line 31. To further minimize metals buildup in the system, a portion of the base product stream 26 may be mixed with the make up alkali stream (via a line not shown) to precipitate the metals. The resulting slurry is then filtered and added to the base product stream and fed to the absorber.

FIG. 3 shows another process embodiment capable of reducing fouling and sulfite precipitation problems which are typical in the electrodialytic scrubbing process. The scheme shown in FIG. 3 not only decreases base loop ionic strength but also, through addition of purge sulfate to a prescrubber eliminates the need for a final $SO_2$ stripping step using air, $N_2$, a high vacuum strength and/or temperature. All of the features in FIG. 3 which are common to FIG. 1 bear the same reference numbers, except that "300" has been added. Thus, the absorber which is numbered "2" in FIG. 1, is numbered "302" in FIG. 3.

The $SO_2$ gases are fed into prescrubber 301, via line 310. The chlorides, nitrates and flyash solids which are present in the flue gas are purged from the system, and removed from the prescrubber via line 311. Makeup water is added to the prescrubber via line 312, and the incoming flue gas is quenched to its adiabatic saturation temperature. Because ionic contaminants are purged out, "Tap water" or similar process water may be used, thus eliminating the need for deionized water in the prescrubbing step.

The quenched and partially cleaned flue gas, typically at its adiabatic saturation temperature (120°-140° F.) and near atmospheric pressure, is passed through absorber 302, via line 313. The flue gas is contacted with an alkaline sulfite solution which is introduced into absorber 302, via line 315. The pH of the flue gas containing sulfite solution is typically about 5 to 12 and contains about 5-15 weight % $Na_2SO_4$, about 12-20 weight % $Na_2SO_3$, about 0-10 weight % $NaHSO_3$ or about 0-2 weight % NAOH. It is preferred to process the flue gas containing sulfite solution at high concentration feed (up to the solubility limit) because it results in the least amount of oxidation (i.e. $Na_2SO_4$ formation) in the absorber and results in the smallest pumping and storage costs.

The $SO_2$ in the flue gas reacts with the alkali, forming bisulfite. The cleaned gas, depleted in $SO_2$, and in conformance with environmental standards, is vented to the atmosphere via line 316. The bisulfite rich solution is removed from absorber 302, via line 317. The bisulfite solution is split, part of the bisulfite is fed into the acid compartments of water splitter 303 via line 320, and part of the bisulfite solution is fed via line 319 to the base compartments of water splitter 303. Water splitter 303 may be made up of alternating cation and bipolar membranes as shown in FIG. 2. For processes where a prescrubber is used univalent selective cation membranes are optional. The univalent selective cation membranes may be used to further cut down on the transport of ionic species likely to foul the membranes and cell internals, and thereby further increase membrane life and process efficiency.

Suitable cation membranes are disclosed in U.S. Pat. No. 4,738,764 and made by Allied-Signal Inc., CMV cation membranes, which are commercially available from Asahi Glass, or Nafion ™ membranes which are commercially available from DuPont.

Examples of useful bipolar membranes are disclosed in U.S. Pat. No. 4,116,889, and made by Allied-Signal Inc.

A direct current is passed across the two compartment water splitter of FIG. 2, generating $H_2SO_3$ in the acid compartment and NAOH, $Na_2SO_3$ and $H_2O$ in the base compartment.

The regenerated base is withdrawn from water splitter 303 via line 315, recycled to absorber 302. A portion of the base product stream may be recycled back to the base compartment of water splitter 303, via a line not shown. The recovered acid and dissolved $SO_2$ are withdrawn from water splitter 303 via line 321, and fed into acid recycle tank 305. $SO_2$ gas is liberated in acid recycle tank 305, and is recovered via line 323. Typically 90% to 96% of all the $SO_2$ present in the acid product stream is recovered in the acid recycle tank which operates at modest pressures of between about 150 and about 760 mm Hg (absolute). Removal of the remaining 4 to 10% of the $SO_2$ in the acid product stream requires a secondary step involving the use of high vacuum or external heat, typically steam, air or nitrogen. The $SO_2$ depleted acid product stream is withdrawn from acid recycle tank 305 via line 324. A portion of the acid recycle stream of line 324, may be diverted to the acid loop of water splitter 303 via line 325. To avoid the secondary isolation step the net bleed portion of $SO_2$ stripped acid stream, 324, corresponding to the extent of sulfate formation in the absorber is fed to prescrubber 301 via line 328. The portion of stream 324 which is not fed to the prescrubber is combined via line 327 with a portion of the spent absorbent stream 317 and fed as stream 319 to the base loop of water splitter 303. The $SO_2$ in the purge stream 328 is reliberated in the prescrubber for reabsorption in the absorber 302; while the $SO_2$ contained in stream 327 reacts with the unconverted bisulfite in the spent absorbent stream, thereby slightly decreasing the pH. Both these operations result in slightly decreased efficiency in absorber 302 (approximately 2–3%) and in water splitter 303 (approximately 5–10%). On the other hand the elimination of the secondary stripping operation significantly reduces the overall energy and capital requirements.

A portion of the $SO_2$ depleted acid product stream 324 may be optionally pretreated in pretreatment unit 306 to remove insoluble metals from the closed loop process, and recycled to the base loop of the water splitter via line 327, or recycled to the absorber (line not shown). In this way, a simplified, substantially closed system, displaying increased membrane and process life is achieved. The recycling of the $SO_2$ depleted acid product stream from the stripper to the base loop results in reduced ionic strength in the base compartment of the water splitter while avoiding a secondary $SO_2$ recovery step simplifying the recovery process thereby reducing the operating costs.

Figure 4:
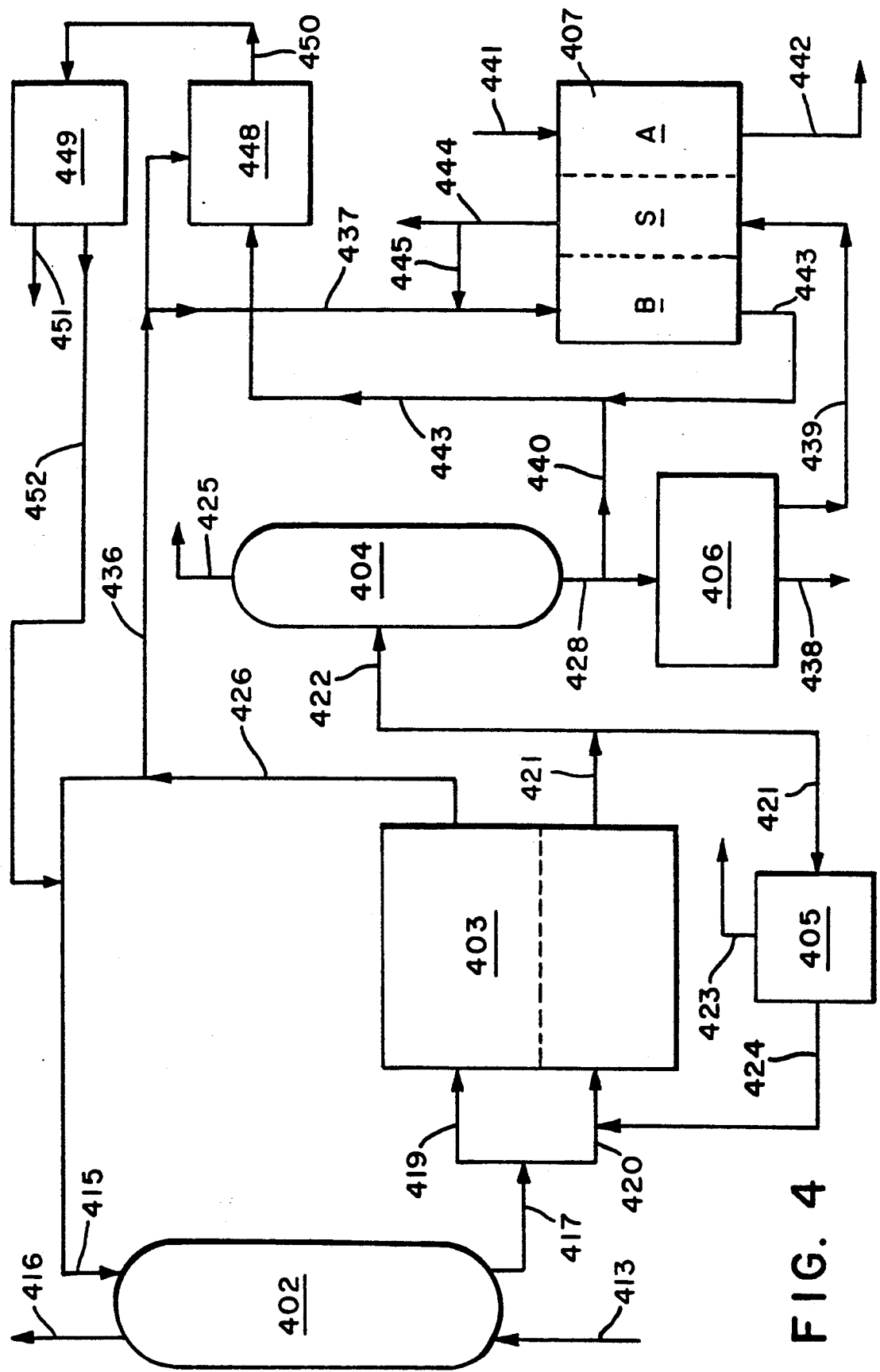
FIG. 4 depicts an alternate process embodiment which yields maximum regeneration of acid and base.

FIG. 4 depicts an alternate embodiment incorporating a two compartment water splitter and a three compartment water splitter to achieve substantially total acid and base recovery. All of the features in FIG. 4 which are common to FIG. 1 bear the same reference numbers, except that "400" has been added. Thus, the absorber which is numbered "2" in FIG. 1, is numbered "402" in FIG. 4. The process depicted in FIG. 4 may be used with the univalent selective cation membranes described above, or with conventional cation membranes.

The $SO_2$ rich gas and the absorbent are fed either directly into absorber 402, via lines 413 and 415 respectively, or optionally through a prescrubber (not shown). Substantially $SO_2$ free gas is vented to the atmosphere via line 416, and the "spent" absorbent solution is withdrawn from the absorber via line 417. The spent absorbent solution is split, and a portion is fed into the base compartment of two compartment water splitter 403, via line 419, and the remainder of the spent absorbent solution is fed to the acid compartment via line 420. The two compartment water splitter has the same configuration as the water splitter described in conjunction with FIG. 2, except that when a prescrubber is employed cation membranes which are not monovalent selective may be used.

A direct current is passed across the water splitter generating $H_2SO_3$ in the acid loop and NAOH, $Na_2SO_3$ and $H_2O$ in the base loop.

The base product is withdrawn from water splitter 403 via line 426, and recycled back to the absorber. A portion of the base product stream may be recycled back to the base compartment of water splitter 403, via a line not shown. Optionally a portion of the base product stream which typically has a pH of between about 6 and 11, may be withdrawn from line 426 via line 436 and treated in a pH adjustment unit 448.

The acid product is withdrawn from the water splitter via line 421 and at least a portion of the acid product is fed to acid recycle tank 405. $SO_2$ may be separated from the acid product via application of vacuum or $N_2$ and removed from the acid recycle tank via line 423. The $SO_2$ depleted acid product from the acid recycle tank may be recycled back to the acid loop of the water splitter via line 424.

The remaining portion of the acid product stream which is withdrawn from the water splitter via line 421 is introduced to stripper 404, via line 422. $SO_2$ is stripped from the acid product stream by any conventional stripping method such as vacuum, air, steam or nitrogen. The recovered $SO_2$ is removed from stripper 404 via line 425. The recovered $SO_2$ may be liquefied, reduced to sulfur, or converted to $H_2SO_4$, and sold.

$SO_2$ depleted acid product is removed from stripper 404 via line 428 and fed to pretreatment unit 406. Insoluble metal contaminants such as Ca, Mg and Fe are removed to the extent desired from pretreatment unit 406 via line 438, and clean sulfate solution is fed to the salt compartment of three compartment water splitter 407 via line 439. The extent of multivalent metals removal is determined by the quality of base generated in three compartment water splitter 407. When the pH of the base product is 9.5 or lower (i.e. $Na_2SO_3$ or $NaHSO_3$/$Na_2SO_2$) a simple pH adjustment (to approximately 10) and filtration is adequate. When the base product is highly basic (such as 1.0N NAOH which has a pH of about 14) the feed has to be further purified via chelating resin ion exchange to reduce the multivalent metal concentrations to less than 0.5 ppm each. A portion of the base product stream from water splitter 403 is split from line 426 via line 436 and is fed to pH adjustment unit 448, or fed to the base compartment of three compartment water splitter 407 via line 437. Water is fed to the acid compartment of water splitter 407 via line 441.

The depleted sulfate stream is withdrawn from electrodialytic water splitter 407 via line 444, and optionally combined with the three compartment water splitter base feed stream line 437 via line 445. The balance of the depleted sulfate stream is returned to the base loop of two compartment water splitter 403 via a line not shown. The base product is removed from water splitter 407 via line 443, and transported to pH adjustment unit 448. A portion of the $SO_2$ depleted acid product stream may be withdrawn from line 428 via line 440, and combined with the base product in line 437 for pH adjustment. Base product streams from water splitters 403 and 407 are combined in pH adjustment unit 448, and the pH is corrected to between about 9.5 and 12. The pH adjustment results in the precipitation of a certain amount of multivalent metals. The combined base product stream is withdrawn from pH adjustment unit via line 450, and processed in filtration unit 449, Cartridge plate and frame or similar type filter can be used. Metals are removed via line 451, and the filtered base product stream is removed via line 452, and recombined with the base product in line 415, for feeding into absorber, 402.

Figure 5:
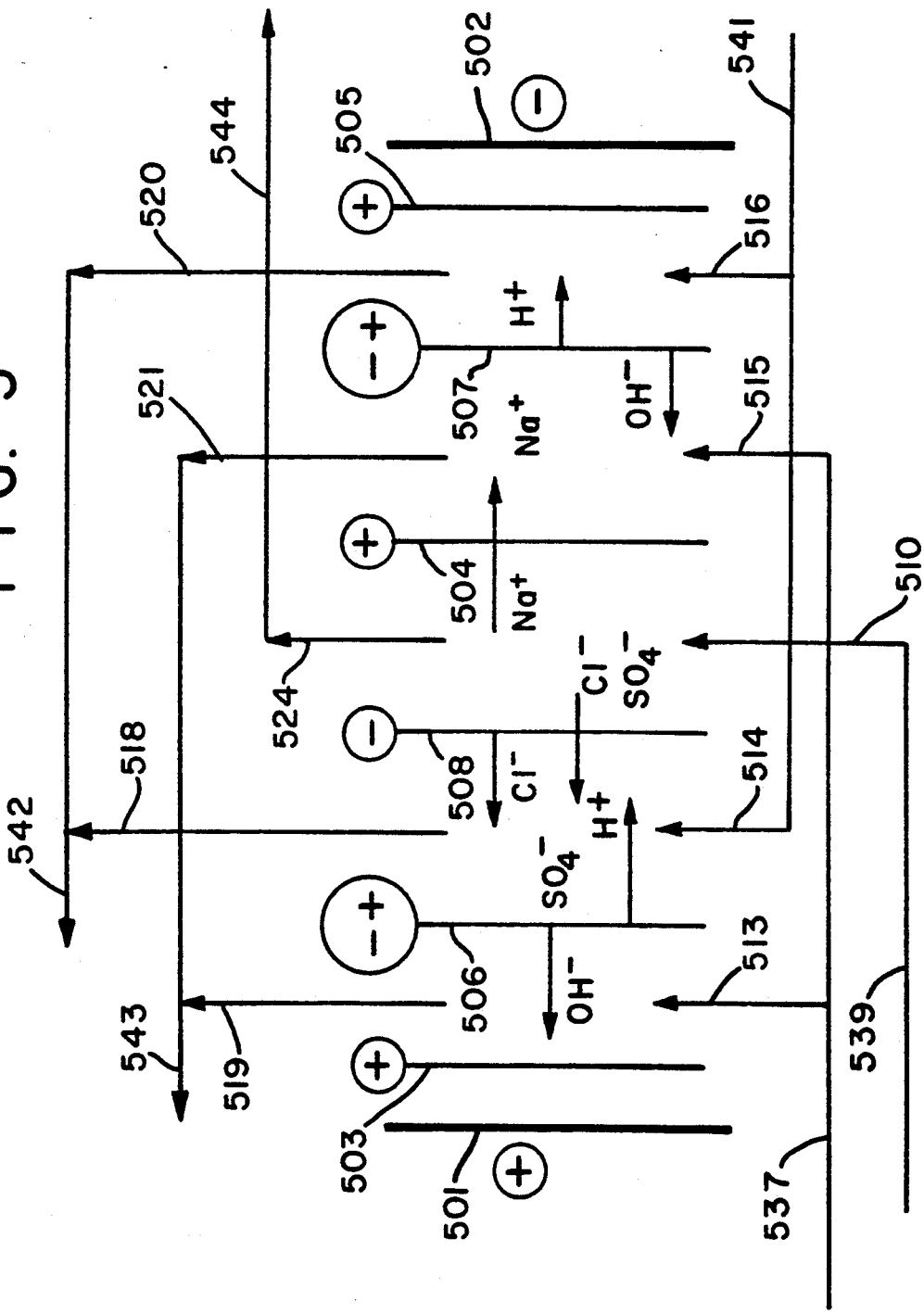
FIG. 5 an expanded view of a typical three compartment water splitter.

The three compartment water splitter is made up of alternating cation, anion and bipolar membranes, and a typical cell is shown in FIG. 5.

Cation membranes, 503 and 505, separate the anode, 501, and the cathode, 502, from the membranes which form the electrodialytic cell. There is an acid compartment between the cation layer of bipolar membrane, 506, and anion membrane, 508; a salt compartment between anion membrane, 508, and cation membrane, 504; and a base compartment between cation membrane, 504, and the anion layer of bipolar membrane, 507. Bipolar membranes, 506 and 507, form the outer boundaries of the cell. Thus, a single cell, having an acid, salt and base compartments is shown. In actual use there are several repeating cells (preferably between 50 and 200) between each set of electrodes. Preferably anode 101 is a DSA type anode and cathode 102 is a stainless steel cathode. The solution fed to the anode and cathode compartments is 5–15 weight % $Na_2SO_4$ for a $Na^+$ system.

Bipolar membrane 507, besides being the second bipolar membrane of the cell shown in FIG. 5, is also the first bipolar membrane of the second cell (not shown).

When a direct current is passed across the water splitter, cations will migrate toward the cathode and anions will migrate toward the anode. The bipolar membranes split water into $H^+$ and $OH^-$. Thus, under the influence of a direct current, the anions in the salt compartment migrate across anion membrane, 508 into the acid compartment, and combine with the hydrogen ions generated by bipolar membrane, 506, to form acid. Similarly, the cations in the salt compartment migrate across cation membrane, 504, into the base compartment and form base with the hydroxide ions generated by bipolar membrane, 507. Acid and base are also respectively formed in the compartments formed between the cation layer of bipolar membrane, 507, and cation membrane, 505, and cation membrane, 503 and the anion layer of bipolar membrane, 506.

The acid formed in the unit is removed via lines 518 and 520 and recovered via line 542. The base formed in the unit is removed via lines 519 and 521 and recovered via line 543. Depleted salt solution is removed from the unit via line 524 and recovered via line 544. Water splitter withdrawal lines 542, 543 and 544 shown on FIG. 5 correspond respectively to lines 442, 443 and 444 shown on FIG. 4. The amount of sulfate salt solution reacted in the three compartment water splitter is equivalent to the extent of oxidation and other anion pick up ($Cl^-$, $NO_3^-$) in the absorber.

The sulfate solution may be processed in the water splitter via any conventional method, ie continuous, batch or "feed and bleed" mode. In the "feed and bleed" mode, the feed and withdrawal rates are varied to keep the solution being treated at a certain characteristic, (ie pH, conductivity or volume).

Suitable anion membranes for use in the above described water splitter are AAV, AMP or ANV made by Asahi Glass, or Ionics' 204-UZL-386 anion membranes. Examples of useful bipolar membranes are disclosed in U.S. Pat. No. 4,116,889, and made by Allied-Signal Inc. Examples of suitable cation membranes are disclosed in U.S. Pat. No. 4,738,764 and made by Allied-Signal Inc., CMV cation membranes, which are commercially available from Asahi Glass, or Nafion TM membranes which are commercially available from Dupont.

The following examples are illustrative and not enumerative. Various modifications and changes may be made within the true scope of the present invention, which is defined by the appended claims.

EXAMPLE 1

A solution having a typical spent scrubber solution composition was formulated (1.93M $NaHSO_3$, 0.18M $Na_2SO_3$, 0.55M $Na_2SO_4$, having a pH of 5.43). Orimulsion flyash (which is flyash resulting from the combustion of orimulsion, an oil/water emulsion made form Orinoco basin heavy oil by British Petroleum, BP) was mixed into the solution at a rate of 1 gm/700 ml. The solution was processed in a hexagonal cell having four Aquatech TM bipolar membranes (made by Allied-Signal Inc. according to the procedures of U.S. Pat. No. 4,116,889) alternating with four Aquatech TM cation membranes (made according to U.S. Pat. No. 4,738,764). Each membrane has an active surface area of 23 $cm^2$. A current of 2.5 A (108 $mA/cm^2$) was passed across the water splitter. Solution was fed the acid and base loops at rate of 1.96 and 2.34 ml/min respectively. The acid loop was operated at a pH of about 1.1 to obtain complete conversion of $NaHSO_3$ to $SO_2$, while the base loop was operated at a pH of about 9.5 to insure 100% conversion of $NaHSO_3$. The feed to the acid and base loops had 38 ppm Ca and 161 ppm Mg and 3.39M total $Na^+$ concentration. Transport of NAOH to the base loop resulted in a larger volume of base output (2.58 ml/min) and a correspondingly smaller acid output (1.32 ml/min). During the experiment $SO_2$ generated in the acid loop was removed via continuous $N_2$ purging so that the steady state concentration of $SO_2$ in the acid loop was about 0.16M. Approximately 95% of the $SO_2$ was recovered via nitrogen purging at ambient temperature and pressure. The $Na^+$ concentration in the acid and base loop product streams were 1.06M and 4.09M respectively. Analysis showed that the Ca and Mg concentrations in the acid product to be 11 ppm and 85 ppm respectively. Material balance showed that about 80% of the Ca and about 67% of the Mg had transported to the base product. Current efficiency for the process was about 84%.

COMPARATIVE EXAMPLE 1

The cation membranes used in Example 1 were replaced with CMS monovalent selective membranes from Tokuyama Soda. Synthetic spent scrubber solution (2.25M $NaHSO_3$, 0.16M $Na_2SO_3$, 0.665M $Na_2SO_4$, 3.9M total Na+, having a pH of about 5.2) contaminated with 36 ppm Ca, 175 ppm Mg was processed at a current of 2.5A (108 $mA/cm^2$). The acid and base loops were operated at the same conditions as in Example 1. The acid and base loops were fed with a solution of 3.9M $Na^+$ at the rate of 1.57 ml/min and 1.87 ml/min respectively. Product solutions were withdrawn from the acid and base loops at the rate 1.113 ml/min and 2.27 ml/min respectively. The acid product stream had 36.2 ppm Ca and 254.3 ppm Mg. The base product stream had a composition of 2.12M $Na_2SO_3$, 0.01M $NaHSO_3$, 0.324M $Na_2SO_4$, and a total Na concentration of 4.9M. Material balance calculations show that essentially 100% of the Mg and 70% of the Ca were retained in the acid loop (in the previous example 80% of the Ca and 67% of the Mg were transported from the acid loop to the base loop). The current efficiency for the process was about 79%. Comparing the two examples, it may be seen that the concentration of Ca and Mg retained in the acid product compartment is three times higher when a CMS (univalent selective) membrane is used. Thus, use of univalent selective ions greatly facilitates both the retention (non-transport) of multivalent cations from the process, and their eventual purging with the sulfate. Requirements regarding acid flush of the base loop are also greatly minimized or even eliminated.

EXAMPLE 2

The product acid from Comparative Example 1 was divided into two streams. One stream corresponding to 6.4% oxidation in the absorber was purged and sent at a rate of 0.39 ml/min to a prescrubber such as shown in FIG. 4. The remaining portion of the stream, containing 0.77M $Na_2SO_4$ and 0.19M$SO_2$, 36.2 ppm Ca, 254.3 ppm mg was mixed at a rate of 0.723 ml/min, with 1.87 ml/min of spent absorbent solution from Comparative Example 1 and processed in the base loop of the water splitter. The base product stream was withdrawn from the base loop at a rate of 2.9 ml/min, a total Na concentration of 4.04M, 31.5 ppm Ca and 171 ppm Mg.

The use of the acid product stream in combination with the spent absorbent as a feed to the base loop has decreased the total ionic strength significantly (i.e. 4.04M total Na concentration versus 4.9M total Na concentration for the base loop product stream in Comparative Example 1). The concentration of metals (Ca, Mg) is also lower than in the feed solution so that their precipitation inside the base loop is reduced.

EXAMPLE 3

To further decrease the metals in the system, the acid product stream from Example 2 was pH adjusted with a small amount of makeup NAOH to raise its pH to 11.5 and filtered. The Ca and Mg in the filtered stream were 20 ppm and 5 ppm respectively. The treated sulfate recycle stream and the spent absorbent were combined and used as the base compartment feed which was processed as in Example 2. The base product stream contained 4.04M $Na^+$, 27 ppm Ca and 110 ppm Mg.

While the total concentration of Na in the base product stream did not change (4.04M in both Examples 2 and 3), the contaminant levels in the base product stream are lower for the process configuration of this Example (27 ppm Ca and 110 ppm Mg) than in Example 2 (31.5 ppm Ca and 171 ppm Mg). Processing the base product stream of this Example would result in the less precipitation and pluggage problems in the water splitter than processing the stream of the previous example.

EXAMPLES 4-7

A hexagonal four cell, two compartment water splitter having four Aquatech ™ bipolar membranes alternating with four CMS cation membranes was used to treat scrubbing solutions having the compositions and percent total dissolved solids (%TDS) listed in Table 1, below:

TABLE 1

| | SCRUBBING SOLUTION COMPOSITION | | | |
|---|---|---|---|---|
| EX. NO. | $NaHSO_3$ (M) | $Na_2SO_3$ (M) | $Na_2SO_4$ (M) | % TDS |
| 4 | 2.146 | 0.38 | 0.32 | 25.51 |
| 5 | 2.32 | 0.384 | 0.39 | 27.61 |
| 6 | 1.59 | 0.24 | 0.606 | 23.66 |
| 7 | 1.57 | 0.23 | 0.525 | 22.50 |

In each run a current of 2.5 A (108 mA/cm$^2$) was passed across the water splitter. The acid loop was operated at a complete conversion of $NaHSO_3$ and $Na_2SO_3$ to $SO_2$. The base loop was operated at the pH indicated in Table 2. The composition of the base loop for each of the Examples is listed in Table 2.

TABLE 2

| | BASE PRODUCT COMPOSITION | | | | |
|---|---|---|---|---|---|
| EX. NO. | $NaHSO_3$ (M) | $Na_2SO_3$ (M) | $Na_2SO_4$ (M) | PH | % TDS |
| 4 | 0.14 | 2.135 | 0.252 | 7.5 | 25.52 |
| 5 | 0.91 | 1.573 | 0.168 | 6.9 | 26.71 |
| 6 | — | 1.702 | 0.483 | 9.5 | 23.15 |
| 7 | 0.53 | 1.195 | 0.505 | 6.8 | 23.79 |

Sulfite/sulfate precipitate was found inside the bipolar membranes used in Examples 4 and 5, which was due to the high percentage of sulfite and sulfate content in the base loop (as shown by the %TDS listed in Table 2). The anion surface of the bipolar membrane is very alkaline. Consequently, in the vicinity of the anion surface of the bipolar membrane, $Na_2SO_3$ was in the form of $Na_2SO_3$. When taking into account this $NaHSO_3$-$Na_2SO_3$ conversion, then the composition of the base loop was 22.76% $Na_2SO_3$+2.83% $Na_2SO_4$ and 24.82% $Na_2SO_3$+1.89% $Na_2SO_4$ for Examples 4 and 5 respectively. Based on the Solubility Table of Seidell, *Solubilities*, v.2, pg. 1120 (1965) both salt solutions exceeded saturation. Accordingly, the precipitation inside the bipolar membrane was a result of the saturation.

In Examples 6 and 7 where the % TDS was approximately 23% the bipolar membranes were in good condition after treatment of the scrubbing solution. Clearly, the problem of precipitation inside the bipolar membrane can be eliminated by lowering the ionic strength (or %TDS) in the base loop.

EXAMPLE 8

A scrubber solution having the composition 1.56M $NaHSO_3$, 0.24M $Na_2SO_3$ and 0.82M $Na_2SO_4$ had 15 ppm Ca, 12 ppm Mg and 1 ppm Fe. The solution was processed in the hexagonal cell used in Examples 6 and 7. A current of 100 ASF (A/ft$^2$, which is equivalent to 2.50 A and 108 mA/cm$^2$) was passed across the cell, and the temperature was maintained at 40° C. The acid feed rate was 2.266 ml/min and the acid product was withdrawn at a rate of 1.958 ml/min, and had a composition of 0.085M $NaHSO_3$+0.11M $H_2SO_3$+0.8M $Na_2SO_4$ (pH 2.14). The base loop was maintained at a pH of 6.66 so that the Ca, Mg and Fe stayed in solution. The feed rate was 5.048 ml/min and the base product was withdrawn at a rate of 5.528 ml/min, and had a composition of 0.645M $NaHSO_3$+1.10M $Na_2SO_3$+0.762M $Na_2SO_4$. No precipitation was observed in the base loop; however, the voltage across the cell rose form 1.7 to 1.9 volts after 2 days. When the cell was opened, the anion layer of the bipolar membrane was covered with some deposits. These deposits were $Mg(OH)_2$, $Ca(OH)_2$ and $Fe(OH)_3$. $Mg(OH)_2$ was the major component based on Atomic Absorption analysis, even though the bulk of the solution in the base loop was at pH 6.66. It is believed that the metal hydroxides formed on the surface of the anion layer of the bipolar membrane because of the basicity of that layer. The rise of the cell voltage was an indication of precipitation within the cell.

COMPARATIVE EXAMPLE 8

Flyash from coal combustion was loaded into the scrubber solution having the composition 1.505M $NaHSO_3$+0.435M $Na_2SO_3$+0.519M $Na_2SO_4$ and a pH of 5.85 at a rate of 0.8 g/l. This solution was fed to the acid loop of the four compartment water splitter used in Example 8 (the fouled bipolar membranes were replaced) at a rate of 2.16 ml/min. The base feed rate was 4.57 ml/min, and the base loop was maintained at a pH of 6.87. The cell was operated at 100 ASF (2.50 A or 108 mA/cm$^2$) and 40° C. for four days. The acid product solution was withdrawn at a rate of 1.807 ml/min, and had a composition of 0.08M NaHSO$_3$+0.13M H$_2$SO$_3$+0.78M Na$_2$SO$_4$ (pH 2.02). The base product was withdrawn at a rate of 4.97 ml/min, and had a composition of 0.47M NaHSO$_3$+1.39M Na$_2$SO$_3$+0.538M Na$_2$SO$_4$. Each day the current was shut off for 10 minutes every six hours. During the periodic 10 minute interruptions the acid feed was also stopped. The rest of the pumps remained running. As SO$_2$ diffused across the bipolar membranes, the hydroxide precipitates on the bipolar surface were dissolved. This was confirmed by the voltage difference of about 0.1 V/cell before and after the current interruptions. In addition, at the end of the fourth day, no precipitate was observed on the surface of the anion layer of the bipolar membrane. Clearly, the combination of current interruption and in situ flushing with the base product (at a pH less than 7) were able to minimize the precipitation on the bipolar surface.

We claim:

1. A method for removing SO$_2$ from an SO$_2$ containing gas which comprises the steps of:
   absorbing SO$_2$ from said SO$_2$ containing gas into an aqueous solution to form an SO$_2$ containing aqueous solution;
   dividing said SO$_2$ containing aqueous solution into two streams;
   subjecting said streams to electrodialytic water splitting by introducing said streams separately into a two compartment water splitter comprising alternating acid and base compartments under conditions sufficient to produce an acid and a base stream;
   recycling said base stream to said absorbing step;
   removing SO$_2$ from said acid stream; and
   recycling a portion of said SO$_2$ depleted acid stream to said base compartment.

2. The method of claim 1 further comprising the step of recycling a portion of said SO$_2$ depleted acid stream to said absorbing step.

3. The method of claim 1 further comprising the step of treating said SO$_2$ containing gas in a prescrubber.

4. The method of claim 1 further comprising the step of feeding a portion of said SO$_2$ depleted acid stream to said prescrubber.

5. The method of claim 4 wherein said second portion of said SO$_2$ depleted acid stream is pretreated prior to recycling to said base compartment.

6. The method of claim 1 wherein a current is passed across said water splitter, said current being interrupted to prevent fouling of the bipolar membrane.

7. The method of claim 1 wherein said alternating acid and base compartments are formed by alternating univalent selective membranes and bipolar membranes.

8. A method for removing SO$_2$ from an SO$_2$ containing gas comprising the steps of:
   prescrubbing said SO$_2$ containing gas;
   absorbing SO$_2$ from said SO$_2$ containing gas into an aqueous solution to form an SO$_2$ containing aqueous solution;
   dividing said SO$_2$ containing aqueous solution into two streams;
   subjecting said streams to electrodialytic water splitting in a two compartment water splitter comprising alternating cation and bipolar membranes which form acid and base compartments by feeding one of said streams into said base compartment and feeding the other of said streams into said acid compartment under conditions sufficient to produce an acid and a base stream;
   recycling said base stream to said absorbing step; and
   removing SO$_2$ from said acid stream.

9. The method of claim 8 further comprising the step of feeding a portion of said SO$_2$ depleted acid stream to said prescrubbing steam.

10. The method of claim 8 wherein said cation membranes are univalent select cation membranes.

11. The method of claim 8 further comprising the step of pretreating SO$_2$ depleted acid stream to remove multivalent metals.

12. The process of claim 8 wherein a current is passed across said water splitter, said current being interrupted to prevent fouling of the bipolar membrane.

* * * * *